(No Model.)
J. R. FREEMAN.
VALVE OPERATING AND INDICATING POST.
No. 413,714. Patented Oct. 29, 1889.
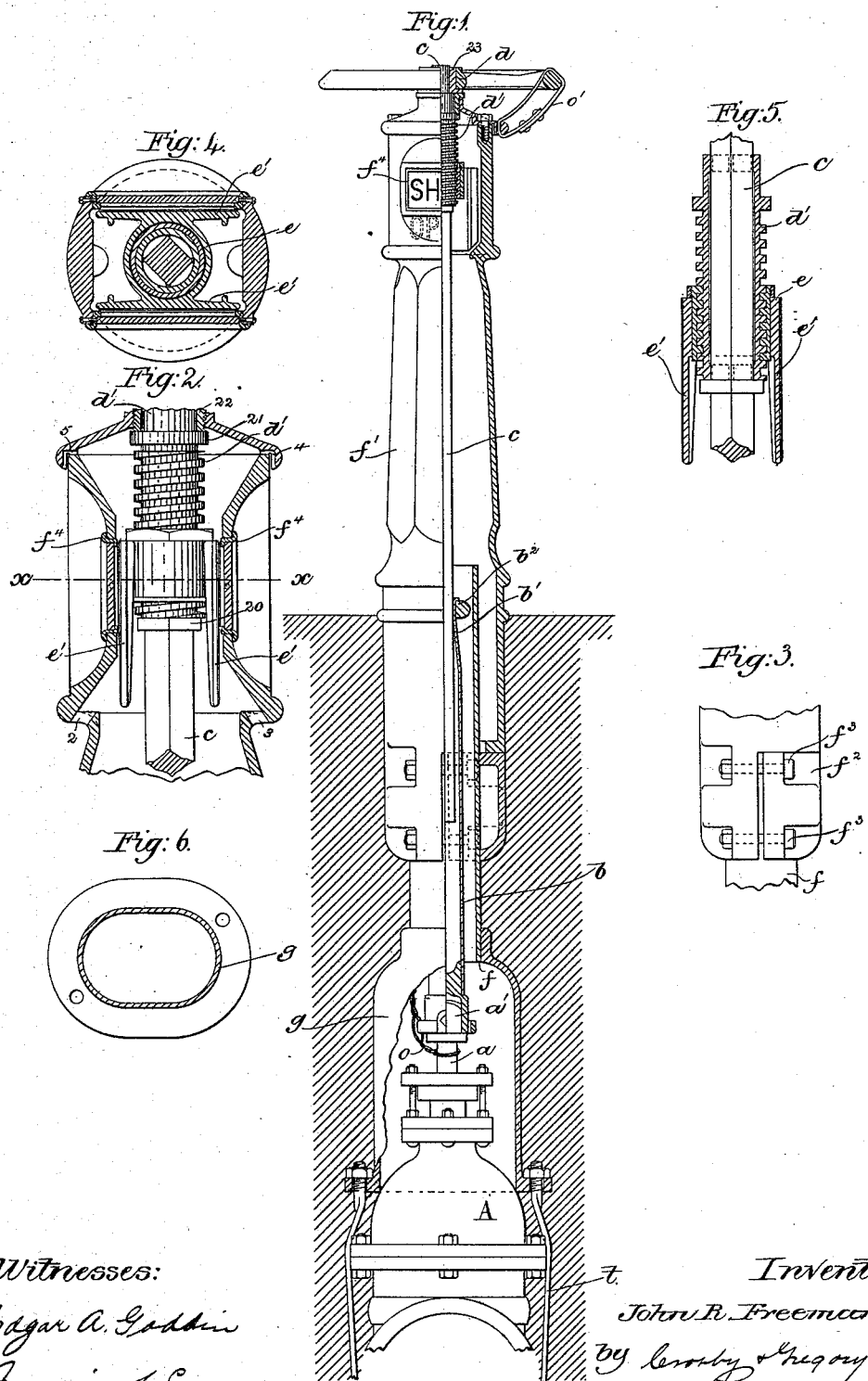
Witnesses:
Edgar A. Goddin
Fredrick L. Emery
Inventor:
John R. Freeman,
by Crosby & Gregory
Attys.

UNITED STATES PATENT OFFICE.

JOHN R. FREEMAN, OF BOSTON, MASSACHUSETTS.

VALVE OPERATING AND INDICATING POST.

SPECIFICATION forming part of Letters Patent No. 413,714, dated October 29, 1889.

Application filed April 23, 1889. Serial No. 308,318. (No model.)

*To all whom it may concern:*

Be it known that I, JOHN R. FREEMAN, of Boston, county of Suffolk, State of Massachusetts, have invented an Improvement in Valve Operating and Indicating Posts, of which the following description, in connection with the accompanying drawings, is a specification, like letters on the drawings representing like parts.

In mill-yards and other places valves for gas, water, and other pipes are usually placed beneath the surface of the ground, the actuating valve-stems of which extend upward, and are accessible sometimes by chambers into which a man can descend, and thus operate the valve manually; but more generally said valve-stems are operated through a small pipe or "valve-box," so called, reaching through valve to surface, said pipe receiving a long key or wrench for turning the valve. In this latter instance the valve is usually invisible to the operator. Various forms of valves are used for this purpose; but the one most commonly used is a gate-valve, wherein the valve proper is moved by a spindle or stem which rotates, but does not move longitudinally. Some valves open by turning the spindles or stems to the right and others to the left. With this form of valve, when used as an underground valve, much difficulty has been experienced by not knowing with certainty the position of the valve or whether the spindle or stem should be turned to the right or to the left to open or close it, and as a result dangerous delays in case of fire or accident sometimes occur owing to difficulty in properly applying the key or wrench to the spindle.

This invention has for its object to provide a valve which is located beneath the surface of the ground and actuated by a rotatable spindle with an indicator to indicate the position of the valve proper, and permanent means, or means positively connected with the spindle or stem, for operating the valve. The indicator is also valuable as showing the exact location of the valve under any and all conditions.

In carrying out this invention the spindle or stem of the valve is appropriately extended to a convenient height by a rod which contains a telescopic joint, compensating for adjustment for different heights, and said extensible spindle or rod is inclosed in a case resembling a post.

The indicator proper, or "tell-tale," as it may be termed, is placed on the spindle or stem in the said inclosing case or post at or near the top, and is movable vertically back of an opening or equivalent formed in the case or post.

The inclosing-post is preferably extensible or provided with a telescopic joint to be readily applicable to valves located at different depths.

Figure 1 shows in elevation and partial section a valve provided with an indicator in accordance with this invention; Fig. 2, an enlarged vertical section of a portion of the valve-spindle, and showing the indicator or tell-tale; Fig. 3, a side elevation of a portion of the lower end of the inclosing case or post, illustrating the clamping device or grip of the telescopic joint; Fig. 4, a cross-section of the inclosing-case, indicator, or tell-tale, and spindle or stem, taken on the dotted line $x\ x$, Fig. 2; Figs. 5 and 6, a detail to be referred to.

The valve-case A, of any suitable or usual construction, contains a valve proper and a spindle or stem, as $a$, having ordinarily a square end $a'$. A key consisting of a tubular rod or bar $b$ is fitted onto the squared end $a'$ of the valve-stem, said tubular rod or bar at its upper end being tapered and made angular, as at $b'$, to receive an angular rod or bar $c$, (herein shown as quadrangular,) a ring $b^2$ encircling the said tapered end of the rod or bar $b$ to prevent splitting, and for the further purpose of preventing the rod $c$ from being placed or pushed down outside the tube $b$. The tubular rod $b$ and rod $c$ comprise the essential elements of an extension of the valve-stem $a$ and are retained in position by a wire $o$, passing around the stem $a$ and through a hole in the tube $b$ or other fastening. The rods $b$ and $c$, joined as described, are extensible, to compensate for the various depths to which the valves A' may be placed. The rod $c$ preferably has at its upper end a hand-wheel or other suitable device $d$, by which it may be revolved, and said rod has formed on it or secured to it a screw-threaded portion $d'$, (see Figs. 1 and 5,) said screw portion being herein shown as cored out interiorly and formed with squared sockets at the ends to receive the rod c. The screw-threaded portion d' rests directly on a flange, (shown as a collar 20 welded to the rod c,) and at the top the portion d' has a flange 21, upon which rests a bushing 22, which bushing surrounds the upper end of the said portion d'. A square or angular collar 23 is placed on the rod c, it resting on the bushing 22 and portion d', and being positively held in place by a pin or screw, these elements, taken collectively, presenting a construction which cannot easily get out of order.

The indicator herein shown consists of a collar e, interiorly screw-threaded to receive the screw-threaded portion d' and carrying the side or face plates e', two being herein shown, these parts constituting the tell-tale. The collar e and its attached side plates are prevented from rotating on the portion d' as the latter revolves by contact with the interior wall of an inclosing-case for the operating parts.

Different valves require a different number of turns, and hence to move the indicator a definite distance a different number of screw-threads to the inch must be employed, and hence I have herein shown the portion d' and collar e removable for this purpose. An inclosing-case is provided for the operating parts, which, as herein shown, consists of a tubular portion f, the foot of which rests upon the valve-case A, and which extends vertically to or near the level of the surface of the ground, and an adjustable top portion is provided, (herein shown as a tubular case f' inclosing the parts,) the lower end of which embraces the portion f, and is secured thereto by a clamping-plate and bolts $f^3$. (See Fig. 3.) This portion f' extends above the surface of the ground, and has at or near its upper end openings at each side, at which part it is so formed interiorly that the tell-tale e e' will bear against its inner side walls, for the purposes above stated.

At the openings at the top of the post sash-boxes $f^4$ are inserted, into which a plate of glass is secured, said sash-boxes being removable for the purpose of cleansing the glass. To prevent the accumulation of moisture on the inside of the glass, vent-holes 2 3 4 5 are provided.

The case f' may be made ornamental, if desired, and in the case shown is formed with panels, upon which the name of the especial part of pipe-stem controlled by the valve may be inscribed.

The hand-wheel d is secured to the post by a strap o', which to render operation possible must be cut.

In operation, by turning the hand wheel d or the upper squared end of the stem c, to which the hand-wheel is attached by a wrench, and thereby rotating the spindle or stem, the tell-tale e e' will be raised and lowered by means of the screw-threaded portion d', according to the direction of rotation of said spindle or stem, and upon the face or faces of said tell-tale the words "Open" and "Shut" are placed, which are visible through the openings $f^4$ in the case.

The foot g of the inclosing-case is made oval or elongated, as indicated in Fig. 6, to be used in different relative positions on the valve.

To prevent the case from being lifted by frost or otherwise, a strap t, inclosing the valve, is attached to the foot g.

I do not desire to limit my invention to any particular construction of spindle or stem for the valve, but one arranged extensible or formed with a telescopic joint is desirable; nor do I desire to limit my invention to any particular formation of case for the operating parts, but one vertically adjustable or having a telescopic joint is preferable. Moreover, even though the indicator or tell-tale be omitted, the remaining key and inclosing-case furnish novel and valuable devices for readily operating an underground valve, and even though the portion of the upper inclosing-case projecting above the surface of the ground be omitted and a telescopic key be retained with its hand-wheel resting ordinarily at or near the surface of the ground, this can, in case of need, be pulled up to a convenient height for operation, and the valve be operated thereby.

I claim—

1. The combination, with an underground valve, of a case for the valve-operating stem, said case comprising two or more parts jointed telescopically and having the clamping-plate $f^2$ and bolts $f^3$, substantially as described.

2. A valve and valve-stem or extension thereof bearing a screw-threaded portion d', combined with an inclosing-case for the valve-stem, having transparent windows or openings through it, and a tell-tale or indicator, as e e', placed upon the screw-threaded portion d' of said valve-stem and movable longitudinally thereon back of the said openings, whereby the location of the valve may be indicated, substantially as described.

3. The valve placed beneath the surface of the ground and having an extended valve-stem, and an indicator moved by said valve-stem, combined with the inclosing-case for the valve-stem, rising above the surface of the ground and having openings through it for showing the tell-tale, substantially as described.

4. A valve and valve-stem and indicator moved by said valve-stem, combined with the inclosing-case consisting of the tubular portion f and the tubular portion f', clamped thereon and having one or more transparent windows or openings, back of which the tell-tale or indicator is moved, substantially as described.

5. The valve, valve-stem, and tell-tale or indicator moved by the valve-stem directly or indirectly, combined with an inclosing-case having transparent portions, through which the indicator is visible, and vent-holes for preventing the accumulation of moisture therein, substantially as described.

6. A valve and valve-stem and indicator or tell-tale moved by it, and an inclosing-case, combined with the removable sash-box, back of which the indicator moves, substantially as described.

7. A valve and valve-stem and the removable screw-threaded portion $d'$, combined with the indicator comprising the removable interiorly-screw-threaded collar $e$ and the side plate or plates $e'$, substantially as described.

8. A valve and valve-stem and indicator bearing words indicating the location of the valve moved directly or indirectly by said stem, combined with an inclosing-case having portions through which the indicator is visible, substantially as described.

In testimony whereof I have signed my name to this specification in the presence of two subscribing witnesses.

JOHN R. FREEMAN.

Witnesses:
BERNICE J. NOYES,
A. S. WIEGAND.